United States Patent
Leger et al.

(10) Patent No.: US 12,361,397 B2
(45) Date of Patent: *Jul. 15, 2025

(54) PAYMENT TRANSACTIONS VIA SUBSTANTIALLY INSTANT COMMUNICATION SYSTEM

(71) Applicant: PayPal, Inc., San Jose, CA (US)

(72) Inventors: David Michael Leger, Campbell, CA (US); Yong K. Rhyu, Foster City, CA (US); Brian Andrew Phillips, San Francisco, CA (US)

(73) Assignee: PayPal, Inc., San Jose, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 16/742,607

(22) Filed: Jan. 14, 2020

(65) Prior Publication Data
US 2020/0226565 A1   Jul. 16, 2020

Related U.S. Application Data

(63) Continuation of application No. 11/521,997, filed on Sep. 15, 2006, now Pat. No. 10,535,049, which is a continuation-in-part of application No. 10/805,414, filed on Mar. 19, 2004, now Pat. No. 7,805,366.

(60) Provisional application No. 60/456,820, filed on Mar. 21, 2003.

(51) Int. Cl.
*G06Q 40/00* (2023.01)
*G06Q 20/00* (2012.01)
*G06Q 20/08* (2012.01)
*G06Q 20/12* (2012.01)
*G06Q 30/04* (2012.01)

(52) U.S. Cl.
CPC .......... *G06Q 20/12* (2013.01); *G06Q 20/085* (2013.01); *G06Q 30/04* (2013.01); *G06Q 40/00* (2013.01)

(58) Field of Classification Search
CPC ...... G06Q 20/12; G06Q 20/085; G06Q 30/04; G06Q 40/00
USPC .......................................................... 705/77
See application file for complete search history.

(56) References Cited

U.S. PATENT DOCUMENTS

| 5,715,314 | A | 2/1998 | Payne et al. |
| 5,778,178 | A | 7/1998 | Arunachalam |
| 5,892,900 | A | 4/1999 | Ginter et al. |

(Continued)

FOREIGN PATENT DOCUMENTS

| EP | 1213689 A2 * | 6/2002 | ............. G06Q 20/00 |
| WO | WO2007108986 A2 | 9/2007 | |

(Continued)

OTHER PUBLICATIONS

Marvin A. Sirbu, Credits and debits on the Internet, Feb. 1, 1997, IEEE, web, 23-29 (Year: 1997).*

(Continued)

*Primary Examiner* — Hai Tran

(57) ABSTRACT

A method and a system conducts payment transactions via instant messaging. The system includes a messaging interface to receive a payment transaction request at a payment application from a network-based device via a network. The messaging interface facilitates substantially instant communication over the network. The payment application, responsive to receiving the payment transaction request, transfers a payment from a user associated with the network-based device to a third party.

20 Claims, 7 Drawing Sheets

(56) References Cited

U.S. PATENT DOCUMENTS

| | | |
|---|---|---|
| 5,943,656 A | 8/1999 | Crooks et al. |
| 5,966,697 A | 10/1999 | Fergerson et al. |
| 5,987,500 A | 11/1999 | Arunachalam |
| 6,212,556 B1 | 4/2001 | Arunachalam |
| 6,292,789 B1 | 9/2001 | Schutzer |
| 6,327,578 B1 | 12/2001 | Linehan |
| 6,343,278 B1 | 1/2002 | Jain et al. |
| 6,415,264 B1* | 7/2002 | Walker ............... G06Q 30/0217 705/26.35 |
| 6,430,602 B1 | 8/2002 | Kay et al. |
| 6,882,979 B1 | 4/2005 | Reay et al. |
| 6,915,138 B2 | 7/2005 | Kraft |
| 6,965,868 B1 | 11/2005 | Bednarek |
| 7,092,913 B2 | 8/2006 | Cannon, Jr. |
| 7,103,576 B2 | 9/2006 | Mann, III et al. |
| 7,158,753 B2 | 1/2007 | Kagan et al. |
| 7,805,366 B2 | 9/2010 | Chen et al. |
| 7,925,591 B2 | 4/2011 | Gajjala et al. |
| 8,335,822 B2 | 12/2012 | Ahmed et al. |
| 8,949,338 B2 | 2/2015 | Ahmed et al. |
| 2002/0002530 A1 | 1/2002 | May |
| 2002/0004733 A1 | 1/2002 | Addante |
| 2002/0013768 A1 | 1/2002 | Ganesan |
| 2002/0016830 A1 | 2/2002 | Nicolai |
| 2002/0038282 A1 | 3/2002 | Montgomery |
| 2002/0072980 A1 | 6/2002 | Dutta |
| 2002/0077978 A1 | 6/2002 | O'Leary et al. |
| 2002/0095372 A1 | 7/2002 | Likourezos et al. |
| 2002/0095376 A1 | 7/2002 | Likourezos et al. |
| 2002/0095377 A1 | 7/2002 | Likourezos et al. |
| 2002/0111915 A1 | 8/2002 | Clemens et al. |
| 2002/0116305 A1 | 8/2002 | Abhyanker |
| 2002/0120582 A1 | 8/2002 | Elston et al. |
| 2002/0152123 A1 | 10/2002 | Giordano et al. |
| 2002/0161707 A1 | 10/2002 | Cole et al. |
| 2002/0169662 A1 | 11/2002 | Claiborne |
| 2002/0188527 A1 | 12/2002 | Dillard |
| 2002/0198847 A1 | 12/2002 | Fahraeus |
| 2003/0013951 A1* | 1/2003 | Stefanescu ............ G06T 7/0012 600/407 |
| 2003/0018566 A1 | 1/2003 | Mackay et al. |
| 2003/0028451 A1* | 2/2003 | Ananian ............ G06Q 30/0615 705/26.42 |
| 2003/0120734 A1 | 6/2003 | Kagan et al. |
| 2003/0126079 A1 | 7/2003 | Roberson et al. |
| 2003/0135470 A1 | 7/2003 | Beard |
| 2003/0154164 A1* | 8/2003 | Mascavage, III ...... G06Q 20/10 705/40 |
| 2003/0208545 A1 | 11/2003 | Eaton et al. |
| 2003/0216996 A1 | 11/2003 | Cummings |
| 2003/0220835 A1 | 11/2003 | Barnes, Jr. |
| 2003/0236752 A1 | 12/2003 | Dawson et al. |
| 2004/0019564 A1 | 1/2004 | Goldthwaite et al. |
| 2004/0039689 A1 | 2/2004 | Penney et al. |
| 2004/0059672 A1 | 3/2004 | Baig et al. |
| 2004/0098609 A1 | 5/2004 | Bracewell et al. |
| 2004/0139015 A1 | 7/2004 | Luttge |
| 2004/0210517 A1 | 10/2004 | Brooks et al. |
| 2004/0224772 A1 | 11/2004 | Canessa et al. |
| 2004/0225606 A1 | 11/2004 | Nguyen et al. |
| 2004/0230536 A1 | 11/2004 | Fung et al. |
| 2005/0021454 A1 | 1/2005 | Karpovich et al. |
| 2005/0097040 A1 | 5/2005 | Chen et al. |
| 2005/0108262 A1 | 5/2005 | Fawcett, Jr. et al. |
| 2005/0132060 A1 | 6/2005 | Mo et al. |
| 2005/0192893 A1 | 9/2005 | Keeling et al. |
| 2005/0256802 A1 | 11/2005 | Ammermann et al. |
| 2006/0020662 A1 | 1/2006 | Robinson |
| 2006/0080384 A1 | 4/2006 | Robinson et al. |
| 2006/0206425 A1 | 9/2006 | Sharma |
| 2006/0212393 A1 | 9/2006 | Brown |
| 2006/0218651 A1 | 9/2006 | Ginter et al. |
| 2006/0229998 A1 | 10/2006 | Harrison et al. |
| 2006/0277146 A1* | 12/2006 | Dively ................ G06Q 20/385 705/40 |
| 2007/0005432 A1 | 1/2007 | Likourezos et al. |
| 2007/0011104 A1 | 1/2007 | Leger et al. |
| 2007/0073837 A1 | 3/2007 | Johnson-McCormick et al. |
| 2007/0112676 A1 | 5/2007 | Kontio et al. |
| 2007/0118476 A1 | 5/2007 | Likourezos et al. |
| 2007/0214249 A1 | 9/2007 | Ahmed et al. |
| 2007/0232232 A1 | 10/2007 | Matsuo et al. |
| 2007/0282962 A1 | 12/2007 | Kim et al. |
| 2008/0034108 A1 | 2/2008 | Chapweske |
| 2009/0106152 A1 | 4/2009 | Dill et al. |
| 2010/0042538 A1 | 2/2010 | Dheer et al. |
| 2010/0250687 A1 | 9/2010 | Smith et al. |
| 2010/0332384 A1 | 12/2010 | Chen et al. |
| 2012/0271707 A1 | 10/2012 | Harrison et al. |
| 2014/0058939 A1 | 2/2014 | Savla |
| 2015/0149555 A1 | 5/2015 | Ahmed et al. |

FOREIGN PATENT DOCUMENTS

| | | |
|---|---|---|
| WO | WO2008033551 A2 | 3/2008 |
| WO | WO2014031866 A2 | 2/2014 |

OTHER PUBLICATIONS

Ahmad Kreydieh, Risk Management in Bot Project Financing, Massachusetts Institute of Technology, web, 8-69, May 1996 (Year: 1996).

"U.S. Appl. No. 11/172,721, Appeal Decision mailed Nov. 4, 2014", 10 pgs.

"U.S. Appl. No. 11/172,721, Response filed Jan. 5, 2015 to Final Office Action dated Mar. 25, 2011", 12 pgs.

"U.S. Appl. No. 12/875,855, Examiner's Answer to Appeal Brief mailed Jan. 16, 2015", 10 pgs.

"U.S. Appl. No. 12/875,855, Reply Brief filed Mar. 16, 2015", 17 pgs.

"U.S. Appl. No. 13/535,189, Response filed Nov. 6, 2014 to Final Office Action dated Jun. 6, 2014", 11 pgs.

"U.S. Appl. No. 13/594,472, Examiner Interview Summary dated Dec. 26, 2014", 5 pgs.

"U.S. Appl. No. 13/594,472, Final Office Action dated Nov. 17, 2014", 23 pgs.

"U.S. Appl. No. 13/594,472, Non Final Office Action dated Mar. 11, 2015", 21 pgs.

"U.S. Appl. No. 13/594,472, Response filed Feb. 17, 2015 to Final Office Action dated Nov. 17, 2014", 14 pgs.

"U.S. Appl. No. 14/611,547, Preliminary Amendment filed Apr. 13, 2015", 7 pgs.

"U.S. Appl. No. 10/805,414, Response filed Jul. 15, 2008 to Advisory Action dated May 1, 2008", 11 pgs.

"U.S. Appl. No. 13/535,189, Response filed Apr. 4, 2013 to Final Office Action dated Jan. 4, 2013", 12 pgs.

"U.S. Appl. No. 11/095,411, Non Final Office Action dated Jun. 13, 2016", 24 pgs.

"U.S. Appl. No. 11/172,721, Response filed Apr. 26, 2016 to Non Final Office Action dated Jan. 26, 2016", 13 pgs.

"U.S. Appl. No. 13/535,189, Non Final Office Action dated Mar. 21, 2016", pgs.

"U.S. Appl. No. 13/535,189, Response filed Jun. 21, 2016 to Non Final Office Action dated Mar. 21, 2016", 17 pgs.

"U.S. Appl. No. 11/646,711, Non Final Office Action dated Sep. 13, 2013", 7 pgs.

"U.S. Appl. No. 11/646,711, Notice of Allowance dated May 27, 2014", 5 pgs.

"U.S. Appl. No. 11/646,711; Response filed Jan. 13, 2014 to Non-Final Office Action dated Sep. 13, 2013", 9 pgs.

"U.S. Appl. No. 12/875,855, Examiner Interview Summary dated Feb. 11, 2014", 3 pgs.

"U.S. Appl. No. 12/875,855, Final Office Action dated Jun. 2, 2014", 24 pgs.

"U.S. Appl. No. 12/875,855, Non Final Office Action dated Oct. 9, 2013", 22 pgs.

(56) References Cited

OTHER PUBLICATIONS

"U.S. Appl. No. 12/875,855, Response filed Feb. 10, 2014 to Non Final Office Action dated Oct. 9, 2013", 10 pgs.
"U.S. Appl. No. 13/535,189, Final Office Action dated Jun. 6, 2014", 10 pgs.
"U.S. Appl. No. 13/535,189, Non Final Office Action dated Dec. 10, 2013", 14 pgs.
"U.S. Appl. No. 13/535,189, Response filed Apr. 9, 2014 to Non Final Office Action dated Dec. 10, 2013", 13 pgs.
"U.S. Appl. No. 13/594,472, Examiner Interview Summary dated Apr. 18, 2014", 3 pgs.
"U.S. Appl. No. 13/594,472, Final Office Action dated May 20, 2014", 20 pgs.
"U.S. Appl. No. 13/594,472, Non Final Office Action dated Jan. 17, 2014", 12 pgs.
"U.S. Appl. No. 13/594,472, Response filed Apr. 15, 2014 to Non Final Office Action dated Jan. 17, 2014", 12 pgs.
"U.S. Appl. No. 13/594,472, Response filed Jun. 25, 2014 to Final Office Action dated May 20, 2014", 9 pgs.
"International Application Serial No. PCT/US2013/056212, International Search Report dated Feb. 10, 2014", 4 pgs.
"International Application Serial No. PCT/US2013/056212, Written Opinion dated Feb. 10, 2014", 6 pgs.
"The American Heritage Dictionary of the English Language", [Online]. Retrieved from Internet: http://education.yahoo.com/reference/dictionary/>, (Accessed Dec. 5, 2013), 1 pg.
"U.S. Appl. No. 10/805,414, Final Office Action dated Jul. 22, 2009", 12 pgs.
"U.S. Appl. No. 10/805,414, Final Office Action dated Jan. 29, 2008", 16 pgs.
"U.S. Appl. No. 10/805,414, Advisory Action dated May 1, 2008", 3 pgs.
"U.S. Appl. No. 10/805,414, Examiner Interview Summary dated Jul. 11, 2008", 4 pgs.
"U.S. Appl. No. 10/805,414, Non Final Office Action dated Oct. 19, 2007", 19 pgs.
"U.S. Appl. No. 10/805,414, Non-Final Office Action dated Sep. 5, 2008", 8 pgs.
"U.S. Appl. No. 10/805,414, Non-Final Office Action dated Dec. 10, 2008", 17 pgs.
"U.S. Appl. No. 10/805,414, Pre-Appeal Brief Request for Review mailed May 29, 2008", 5 pgs.
"U.S. Appl. No. 10/805,414, Response filed Mar. 31, 2008 to Final Office Action dated Jan. 29, 2008", 10 pgs.
"U.S. Appl. No. 10/805,414, Response filed Apr. 9, 2009 to Non Final Office Action dated Dec. 10, 2008", 11 pgs.
"U.S. Appl. No. 10/805,414, Response filled Dec. 4, 2007 to Non-Final Office Action dated Oct. 19, 2007", 13 pgs.
"U.S. Appl. No. 11/095,411, Non-Final Office Action dated Feb. 27, 2009", 13 pgs.
"U.S. Appl. No. 11/095,411, Preliminary Amendment mailed Feb. 23, 2007", 11 pgs.
"U.S. Appl. No. 11/095,411, Preliminary Amendment mailed Aug. 25, 2005", 8 pgs.
"U.S. Appl. No. 11/095,411, Response filed May 27, 2009 to Non Final Office Action dated Feb. 27, 2009", 14 pgs.
"U.S. Appl. No. 11/172,721, Response filed Mar. 9, 2009 to Non-Final Office Action dated Oct. 9. 2008", 16 pgs.
"U.S. Appl. No. 11/172,721, Non-Final Office Action dated Jun. 3, 2009", 22 pgs.
"U.S. Appl. No. 11/646,711, Final Office Action dated May 8, 2009", 10 pgs.
"U.S. Appl. No. 11/646,711, Non-Final Office Action dated Oct. 6, 2008", 9 pgs.
"U.S. Appl. No. 11/646,711, Preliminary Amendment filed Jul. 31, 2008", 7 pgs.
"U.S. Appl. No. 11/646,711, Response filed Jan. 6, 2009 to Non-Final Office Action dated Oct. 6, 2008", 11 pgs.
"U.S. Appl. No. 11/172,721, Non-Final Office Action dated Oct. 9, 2006", 16 pgs.

"ExtendLabs.Auction Messenger Proffesional (Online)", Retreived from Internet : Section:home._product_details_and_feaurures, (Apr. 2003).
"International Application Serial No. PCT/US2007/20109, Search Report and Written Opinion dated Sep. 4, 2008", p. 220.
"Tech Crunch Article and Comments", [Online]. Retrieved from the Internet: , (Feb. 15, 2006).
"Using your Cellphone as a Credit Card", The Wall Street Journal Online, WSJ.com, (Feb. 8, 2006).
"U.S. Appl. No. 11/095,411, Appeal Decision malled Jun. 12, 2015", 11 pgs.
"U.S. Appl. No. 13/594,472, Response filed Jul. 11, 2015 to Non Final Office Action dated Mar. 11, 2015", 22 pgs.
"U.S. Appl. No. 12/875,855, Decision on Pre-Appeal Brief mailed Sep. 3, 2014", 2 pgs.
"U.S. Appl. No. 12/875,855, Pre-Appeal Brief Request filed Jul. 21, 2014", 6 pgs.
"U.S. Appl. No. 13/594,472, Non Final Office Action dated Jul. 23, 2014", 22 pgs.
"U.S. Appl. No. 11/172,721, Non Final Office Action dated Jan. 26, 2010", 19 pgs.
"U.S. Appl. No. 13/594,472, Appeal Brief filed Dec. 18, 2015", 31 pgs.
"U.S. Appl. No. 13/594,472, Final Office Action dated Sep. 18, 2015", 29 pgs.
"U.S. Appl. No. 10/805,414, Notice of Allowance dated May 28, 2010", 19 pgs.
"U.S. Appl. No. 11/095,411, Advisory Action dated Sep. 8, 2011", 3 pgs.
"U.S. Appl. No. 11/095,411, Advisory Action dated Nov. 19, 2009", 4 pgs.
"U.S. Appl. No. 11/095,411, Appeal Brief filed Dec. 12, 2011", 34 pgs.
"U.S. Appl. No. 11/095,411, Examiner's Answer to Appeal Brief mailed Jan. 30, 2012", 30 pgs.
"U.S. Appl. No. 11/095,411, Final Office Action dated Jun. 18, 2010", 16 pgs.
"U.S. Appl. No. 11/095,411, Final Office Action dated Jul. 13, 2011", 24 pgs.
"U.S. Appl. No. 11/095,411, Non Final Office Action dated Mar. 7, 2011", 20 pgs.
"U.S. Appl. No. 11/095,411, Pre-Appeal Brief Request mailed Oct. 10, 2011", 5 pgs.
"U.S. Appl. No. 11/095,411, Response filed Mar. 29, 2010 to Non Final Office Action dated Dec. 28, 2009", 13 pgs.
"U.S. Appl. No. 11/095,411. Response filed Jun. 2, 2011 to Non-Final Office Action dated Mar. 7, 2011", 20 pgs.
"U.S. Appl. No. 11/095,411, Response filed Aug. 25, 2011 to Final Office Action dated Jul. 13, 2011", 21 pgs.
"U.S. Appl. No. 11/095,411, Response filed Oct. 18, 2010 to Final Office Action dated Jun. 18, 2010", 14 pgs.
"U.S. Appl. No. 11/172,721, Appeal Brief Filed Sep. 12, 2011", 37 pgs.
"U.S. Appl. No. 11/172,721, Decision on Pre-Appeal Brief Request dated Aug. 8, 2011", 2 pgs.
"U.S. Appl. No. 11/172,721, Examiner Interview Summary dated Aug. 26, 2010", 3 pgs.
"U.S. Appl. No. 11/172,721, Examiners Answer dated Dec. 20, 2011", 26 pgs.
"U.S. Appl. No. 11/172,721, Final Office Action dated Mar. 25, 2011", 19 pgs.
"U.S. Appl. No. 11/172,721, Final Office Action dated May 12, 2010", 21 pgs.
"U.S. Appl. No. 11/172,721, Non-Final Office Action dated Oct. 29, 2010", 21 pgs.
"U.S. Appl. No. 11/172,721, Notice of Non-Compliant amendment dated Dec. 9, 2009", 3 pgs.
"U.S. Appl. No. 11/172,721, Pre-Appeal Brief Request filed Jun. 24, 2011", 5 pgs.
"U.S. Appl. No. 11/172,721, Reply Brief filed Feb. 17, 2012", 7 pgs.
"U.S. Appl. No. 11/172,721, Response filed Jan. 20, 2011 to Non Final Office Action dated Oct. 29, 2010", 13 pgs.

(56) References Cited

OTHER PUBLICATIONS

"U.S. Appl. No. 11/172,721, Response filed Sep. 7, 2010 to Final Office Action dated May 12, 2010", 11 pgs.
"U.S. Appl. No. 11/172,721, Response filed Jan. 11, 2010 to Notice of Non-Compliant dated Dec. 9, 2009", 15 pgs.
"U.S. Appl. No. 11/646,711, Final Office Action dated Jul. 8, 2010", 8 pgs.
"U.S. Appl. No. 11/646,711, Response filed Mar. 30, 2010 to Non Final Office Action dated Nov. 30, 2009", 11 pgs.
"U.S. Appl. No. 11/646,711, Response filed Nov. 8, 2010 to Final Office Action dated Jul. 8, 2010", 11 pgs.
"U.S. Appl. No. 12/875,855 , Response filed May 1, 2012 to Non Final Office Action dated Mar. 26, 2012", 9 pgs.
"U.S. Appl. No. 12/875,855, Final Office Action dated Jul. 18, 2012", 20 pgs.
"U.S. Appl. No. 12/875,855, Non Final Office Action dated Mar. 26, 2012", 20 pgs.
"U.S. Appl. No. 12/875,855, Response filed Dec. 18, 2012 to Final Office Action dated Jul. 18, 2012", 10 pgs.
"U.S. Appl. No. 13/535,189, Final Office Action dated Jan. 4, 2013", 15 pgs.
"U.S. Appl. No. 13/535, 189, Non Final Office Action dated Aug. 17, 2012", 24 pgs.
"U.S. Appl. No. 13/535,189, Response filed Nov. 19, 2012 to Non Final Office Action dated Aug. 17, 2012", 11 pgs.
"International Application Serial No. PCT/US2007/006180, International Preliminary Report on Patentability dated Sep. 25, 2008", 7 pgs.
"International Application Serial No. PCT/US2007/006180, International Search Report dated Oct. 2, 2007", 2 pg.
"International Application Serial No. PCT/US2007/006180, Written Opinion dated Oct. 2, 2007", 6 pgs.
"International Application Serial No. PCT/US2007/20109, International Preliminary Report on Patentability dated Mar. 26, 2009", 7 pgs.
"International Application Serial No. PCT/US2007/20109, Written Opinion dated Sep. 4, 2008", 3 pgs.
"The Authoritative Dictionary of IEEE Standards Terms", IEEE 100, Seventh Edition IEEE Standards Information Network/IEEE Press, (Dec. 1, 2000), 37 pgs.
Allen, Helen, "Innovations in retail payments: e-payments", Bank of England. Quarterly Bulletin. London: Winter 2003 vol. 43; Iss. 4, (2003). p. 428.
Focarelli, D., et al., "Why Do Banks Merge?", Journal of Money, Credit, and Banking vol. 34, No. 4, (Nov. 2002), 1047-1066.
Godfrey, Mike, "Panama Bank Merge to Form Biggest Banking Group in Central America", Tax-news.com, New York Tuesday, (May 2000), 5 pgs.
Linder, J. C, et al., "Bank Mergers: Integration and Profitability", Journal of Finanical Services Research, (1992), 35-55.
U.S. Appl. No. 10/805,414, Response filed Nov. 13, 2009 to Final Office Action dated Jul. 22, 2009, 13 pgs.
U.S. Appl. No. 11/095,411, Final Office Action dated Aug. 28, 2009, 17 pgs.
U.S. Appl. No. 11/095,411, Non-Final Office Action dated Dec. 28, 2009 15 pgs.
U.S. Appl. No. 11/095,411, Response filed Oct. 28, 2009 to Final Office Action dated Aug. 28, 2009, 13 pgs.
U.S. Appl. No. 11/172,721, Response filed Aug. 28, 2009 to Non Final Office Action dated Jun. 3, 2009, 15 pgs.
U.S. Appl. No. 11/646,711, Non-Final Office Action dated Nov. 30, 2009, 7 pgs.
U.S. Appl. No. 11/646,711, Response filed Sep. 8, 2009 to Final Office Action dated Sep. 8, 2009, 11 pgs.
U.S. Appl. No. 14/611,547, filed Feb. 2, 2015, Peer-to-Peer Trading Platform.
"U.S. Appl. No. 11/646,711, Notice of Allowance dated Sep. 30, 2014", 5 pgs.
"U.S. Appl. No. 12/875,855, Appeal Brief filed Sep. 18, 2014", 13 pgs.
"U.S. Appl. No. 13/594,472, Examiner Interview Summary dated Sep. 17, 2014", 3 pgs.
"U.S. Appl. No. 13/594,472, Response filed Oct. 22, 2014 to Non Final Office Action dated Jul. 23, 2014", 12 pgs.
U.S. Appl. No. 11/168,277, Non-Final Office Action mailed Aug. 24, 2009, 18 pages.
U.S. Appl. No. 11/168,277, Response filed Jun. 19, 2009 to Restriction Requirement mailed Mar. 19, 2009, 5 pages.
U.S. Appl. No. 11/168,277, Restriction Requirement mailed Mar. 19, 2009, 6 pages.
U.S. Appl. No. 11/521,997, Non-Final Office Action mailed Aug. 11, 2009, 18 pages.
U.S. Appl. No. 11/521,997, Response filed Feb. 11, 2010 to Non-Final Office Action mailed Aug. 11, 2009, 8 pages.

* cited by examiner

PAYMENT TRANSACTIONS VIA SUBSTANTIALLY INSTANT COMMUNICATION SYSTEM

CROSS-REFERENCE TO RELATED APPLICATIONS

This application is a continuation of U.S. patent application Ser. No. 11/521,997, filed on Sep. 15, 2006, now U.S. Pat. No. 10,535,049, issued on Jan. 14, 2020; which is a continuation-in-part of U.S. patent application Ser. No. 10/805,414, filed on Mar. 19, 2004, now U.S. Pat. No. 7,805,366, issued on Sep. 28, 2010; which claims the benefit of U.S. Patent Application Ser. No. 60/456,820, filed on Mar. 21, 2003; the disclosures of which are incorporated herein by reference in their entireties.

TECHNICAL FIELD

The present application relates generally to the technical field of data processing and, in one specific example, to a method and system of conducting payment transactions via substantially instant communication systems.

BACKGROUND

Consumers have come to expect that electronic transactions should take a minimum amount of time and be convenient. Popularity of communication via "instant messaging" and other forms of text messaging applications has increased substantially in recent years. "Instant messaging" is fast, convenient, and relatively inexpensive, which may be the reasons for its popularity.

Vendors spend millions every year to advertise their products and services to potential client users. Order volume may be increased when client users immediately make a purchase in response to point of sale displays and other advertisements, for instance. Client users may be directed to physical locations, call centers, or websites where the client user directly interacts with the vendor, or a distributor/representative thereof. The time involved for each client user to make a purchase may include time to give credit card and/or other personal information, such as a shipment address. Because potential client users have come to expect fast transactions, they may be reluctant to make these types of purchases because of the time involved in the transaction.

BRIEF DESCRIPTION OF THE DRAWINGS

Some embodiments are illustrated by way of example and not limitation in the figures of the accompanying drawings in which.

DETAILED DESCRIPTION

Example methods and systems to conduct payment transactions via substantially instant messaging are described. The method comprises receiving a request at a financial service provider from a network-based device via a messaging interface, and responsive to receiving the request, transferring a payment from a user to a third party via the financial service provider. The network-based device is associated with the user, and the request is associated with the third party. The messaging interface facilitates substantially instant communication over a network.

The system includes a messaging interface to receive a payment transaction request at a payment application from a network-based device via a network. The messaging interface facilitates substantially instant communication over the network. The payment application, responsive to receiving the payment transaction request, transfers a payment from a user associated with the network-based device to a third party.

A messaging system comprises an interface. The interface includes a messaging pane to facilitate substantially instant communication via a network; and a payment transaction feature to receive a payment transaction request in association with a message in the messaging pane.

Integrating a messaging server (such as Skype®) with a financial service provider (such as PayPal®) allows users to make available their private payment information and shipping information to the financial service provider (FSP), which in turn can provide the shipping information and payment to a merchant. The product may then be purchased and shipped to the user without the exchange of sensitive personal information between the user and the merchant. A "handle", "key", or a reference is what may be exchanged during the open communication session of the parties, for example, an instant messaging communication session. This key is a reference to the user's payment and shipping information at the FSP. In one embodiment, the key received by the merchant is forwarded to the FSP upon receipt. In another embodiment, the key is sent directly to the FSP from the user.

In the following description, for purposes of explanation, numerous specific details are set forth in order to provide a thorough understanding of example embodiments. It will be evident, however, to one skilled in the art that the present invention may be practiced without these specific details.

Architecture

Figure 1:
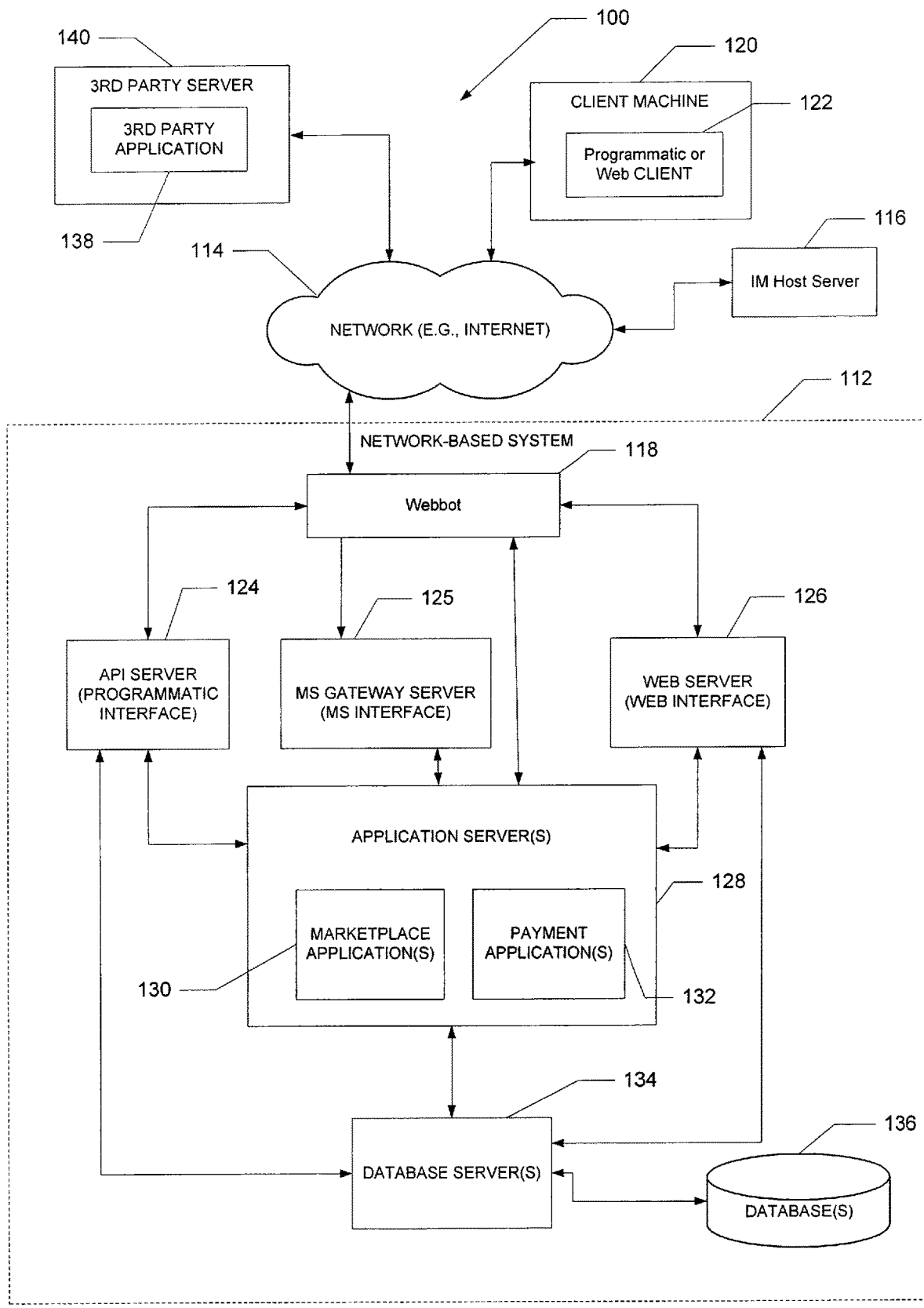
FIG. 1 illustrates a network diagram depicting a system, according to an example embodiment, having a client-server architecture.

FIG. 1 illustrates a network diagram depicting a system 100 having a client-server architecture, according to an example embodiment of the present invention. A system, in the example form of an electronic system 112, provides server-side functionality, via a network 114 (e.g., the Internet, a public or private telephone network (wireline or wireless), a private wireless network using technologies such as Bluetooth or IEEE 802.11x or other networks) to one or more clients. FIG. 1 illustrates, for example, a client 122, such as a web client (e.g., a browser, such as the Internet Explorer® browser developed by Microsoft®), a device application, and/or a programmatic client executing on client machine 120, e.g. on a network-based device. Further, while the system 100 shown in FIG. 1 employs a client-server architecture, embodiments are of course not limited to such an architecture, and could equally well find applications in a distributed, or peer-to-peer, architecture system.

The network 114 may include a mobile telephone network, a wireless wide area network (WWAN), a wireline telephone network, a wireless local area network (wireless LAN or WLAN), a wireless Metropolitan Area Network (MAN), and/or a wireless personal area network (PAN) (e.g., a Bluetooth® network). Other network-based technologies that may be used to connect include PON, VSAT satellite, Micro-impulse Radar, Radio Frequency identification (RFID), UltraWide Band, and/or Infrared. The network-based device may connect to the web using mobile internet exchange, e.g. Wireless Application Protocol (WAP) and/or Hypertext Transport Protocol (HTTP).

The client machines, including network-based device(s) 120, may include a mobile device, a palmtop computer, a laptop computer, a desktop computer, a personal digital assistant, a cellular telephone, a communications device, a wireless telephone, a land-line telephone, a control system, a camera, a scanner, a television, television cable, a telephone with a web browser, a facsimile machine, a printer, a pager, and/or a personal trusted device. The device 120 may include a card, such as a smart card, a magnetic card, and/or a key card. The device may include a telephone or any device capable of Short Messaging Service (SMS) messaging, instant messaging (IM), text messaging, multimedia messaging service (MMS) messaging and/or generating audio tones, such as dual-tone multi-frequency (DTMF) tones. The device may be browser-enabled. The device 120 may enable mobile videophone communications, digital television signals, and/or digital radio signals. The device may include a receiver to receive near field communications. The scanner device may include a bar code reader/scanner, a Radio Frequency Interface System (RFIS) reader, and/or a symbol reader/scanner.

The device 120 may engage in an interactive message and/or open communication session, such as SMS, IM, electronic mail, xHTML, XML, Wireless Application Protocol (WAP), web, interactive voice response (IVR) and/or other mobile interfaces. The interactive messaging or open communication session may involve multiple technology modalities, e.g., the client user may engage the system via IM and receive a responsive communication from the system 112 via e-mail with an embedded hyperlinked URL directing the client user's device to a WAP or web page or via a telephone call. A hyperlinked URL may be delivered directly to the device from one or more application server(s) 128 of system 112 and may be used to access a web site or a microbrowser, such as a WAP site.

Turning specifically to the network-based system 112, the one or more application servers 128 may host one or more marketplace application(s) 130 and one or more payment application(s) 132. The marketplace application(s) 130 may provide a number of marketplace functions and services to client users, such as a buyer, and/or to third parties, such as sellers, vendors, or any user, who access the system 112. The marketplace applications 130 may provide a number of offering mechanisms and price-setting mechanisms; whereby a seller may list goods or services for sale, a seller may promote their offers, a buyer can express interest in or indicate a desire to purchase such goods or services or to donate, and a price can be set for a transaction pertaining to the goods or services. Payment applications 132 may provide a number of payment services and functions to users. While the marketplace and payment applications 130 and 132 are shown in FIG. 1 to both form part of the networked system 112, it will be appreciated that, in alternative embodiments, the payment applications 132 may form part of a payment service that is separate and distinct from the networked system 112.

In the instance where the device 120 accesses the applications 130 and 132 via the MS Interface, the client device 120 may use an "instant messaging" service via an IM Host server 116 for substantially instant messaging. In example embodiments, the IM host server 116 may be selected from a group including Skype®, Yahoo® IM, AIM® of AOL®, MSN® Messenger of Microsoft®, and ICQ® of the ICQ Network. The IM Host server 116 may be included within the network-based system 112 and therefore enable secure transactions with the application server(s) 128, and may specifically be included within the payment application(s) 132.

The device 120 may access the application servers 128, such as the various marketplace and payment applications 130 and 132, via a Webbot 118, and via a system interface. The Webbot 118 is a dynamic Web page object evaluated when the webpage is opened in a Web browser or saved. In example embodiments, the Webbot 118 includes a Jabber® host or server interface. The Webbot 118 may be a streaming XML technology that may be used for instant messaging. The Webbot 118 may be open-source, neutral, and universal to enable communications between the system 112 and any server, such as the IM host server 116. Further, the Webbot 118 may be decentralized (i.e., located within the system 112) and therefore enable secure transactions between the device 120 and the system 112.

Decentralizing the Webbot may enable secure transactions. In particular, the information may be encrypted because an application may be on the client's machine, where information may be encrypted without network exposure.

The system interface between the device 120 and the applications 130 and 132 may include a programmatic interface supported by an Application Program Interface (API) server 124, a Messaging Service (MS) Interface supported by an MS Gateway Server 125, and/or a web interface supported by a web server 126. The web interface may include a web browser or any microbrowser, such as xHTML or WAP. Similarly, the programmatic client 122 accesses the various services and functions provided by the application server(s) 128, via the programmatic interface provided by the API server 124 and/or the web server 126. The programmatic client 122 may, for example, be a seller application (e.g., TurboLister® application) to enable sellers to author and manage listings on the networked system 112 in an off-line manner, and to perform batch-mode communications between the programmatic client 122 and the networked system 112.

In an additional embodiment, an application supported by one or more applications of the application server(s) may be downloadable to the network-based device. The device(s) may host the interface associated with the one or more applications of the application server(s) 128. The interface on the device may be an API interface, an MS interface, a web interface, and/or another appropriate communication interface. Consumer wireless device platforms, such as Java 2 Platform Micro Edition (J2ME), J2SE and J2EE allow developers to use Java and a wireless toolkit to create applications and programs for the device 120. The J2ME interface may include an application programming interface (API) for the device. The application of the programmatic client may also access the Internet using, for example, Binary Runtime Environment for Wireless (BREW).

The client 122, for example, the programmatic client, executed on the client machine 120 may access the application server(s) 128 via the web interface of the web server. The programmatic client may be selected on the device and the Internet may be launched in a background process. The programmatic client may additionally or alternatively access the server(s) 128 via the MS interface of the MS Gateway server 125, and/or via the programmatic interface of the API server 124. In an embodiment, the downloaded application described herein may include the programmatic client.

The device 120 may host the interface associated with one or more payment application(s) 132 of the server(s) 128. The client 122, such as the web client, the device application, and/or the programmatic client, may be associated with a financial service provider (FSP) of the payment application(s). In an additional embodiment, the client 122 may be associated with a third party application 138 of a third party server 140. The third party application may, for example, provide one or more promotional, marketplace or payment functions that are supported by the relevant applications of the network-based system 112.

The payment application(s) and/or the FSP may operate independent of the third party. The payment application(s) and/or the FSP may be related to the third party, in other embodiments.

The payment applications 132 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 130. The payment applications, e.g., a financial service provider, may also extend credit to user, and/or may also have access to other funding sources to complete transactions—e.g. a credit card, a bank account, and/or a credit line. The FSP may operate using the payment application(s) 132.

The WebBot 118 may be part of the payment application(s) 132 in some embodiments. In an example, through the WebBot 118, and in response to a prompt from an application executed on the device 120, the user may submit a payment transaction request to the payment application(s). A payment transaction from a user to a third party vendor may then be created. The payment application(s) 132 may send a payment confirmation message, e.g., via IM and the IM host server 116, to the user and/or the third party vendor.

The third party or vendor may receive, from the payment application(s) and/or the FSP, information regarding a requested payment transaction for a product, a service, or a donation amount, information regarding the shipment address specified by the client user, and payment confirmation. The payment application(s) and/or the financial service provider may secure financial information of the client user with respect to the third party. The FSP may not be sharing the financial information of the client user with the third party. For example, the payment may be received by the third party exclusive of the payment method and/or financial information of the client user, including credit card information, bank information and/or other client user account information.

The system 112 and the various marketplace and payment applications 130 and 132 may also be implemented as standalone software programs, which do not necessarily have networking capabilities. In this example, the device 120 may be directly connected to the marketplace application(s) 130 and/or payment application(s) 132, without using the network 114. In other examples, the electronic system 112 may be any online marketplace, for example, www.walmart.com, www.ebay.com or www.llbean.com.

The application server(s) 128 may be coupled to one or more database servers 134 that facilitate access to one or more databases 136. The application(s) may have access to the database(s) 136 having, for example, personal user account information. The user account information may include payment information associated with the client user and an address destination of the client user, for example.

The client 122 may operate a program supported by the one or more database server(s) 134. The database server(s) 134 may support one or more account information links on a user interface of the network-based device, for example, using the web client 122. By accessing the database server(s) 134, the client user may add, amend or delete account information of the client user, among other information. In an embodiment, the client user may select a default shipment address and a default payment method in the payment application(s) discussed herein. Depending on whether goods are purchased, a service is requested, a donation is made, or a promotion is selected, a default shipment address, e.g. electronic mail address or a residential address, a business addresses, or a P.O. Box, may be selected by the client user in the payment application(s). One of the default payment methods may include direct transfers from system account balances, internal credit, a gift certificate, a bank account, a debit card, buyer credit, and/or a credit card.

The payment application(s) 132 may transfer funds (or other value) between users. The payment application 132 may, responsive to the server(s) receiving a payment transaction request from the user, transfer a payment from the user to the third party. The payment may be automatically transferred, as discussed herein.

In an example embodiment of the present invention, a buyer may be a client user that submits a purchase request, such as a purchase initiation code associated with a promotion offer, for example, or associated with an offer of an online marketplace or another marketplace medium, to the FSP. The user may submit the purchase initiation code through the network-based device while in an established communication session with the payment application 132. The communication session may include an instant message communication session, or a telephone call, or a website, for instance. The user may be requested to submit verification of identity, such as a password and username, upon making the purchase request, as discussed herein. Payment in connection with the request may be made using the FSP, for example, by debiting a first user account and crediting a second user account (or vendor account), accordingly. A means for transferring the payment is through the payment application 132.

Application Server(s)

Figure 2:
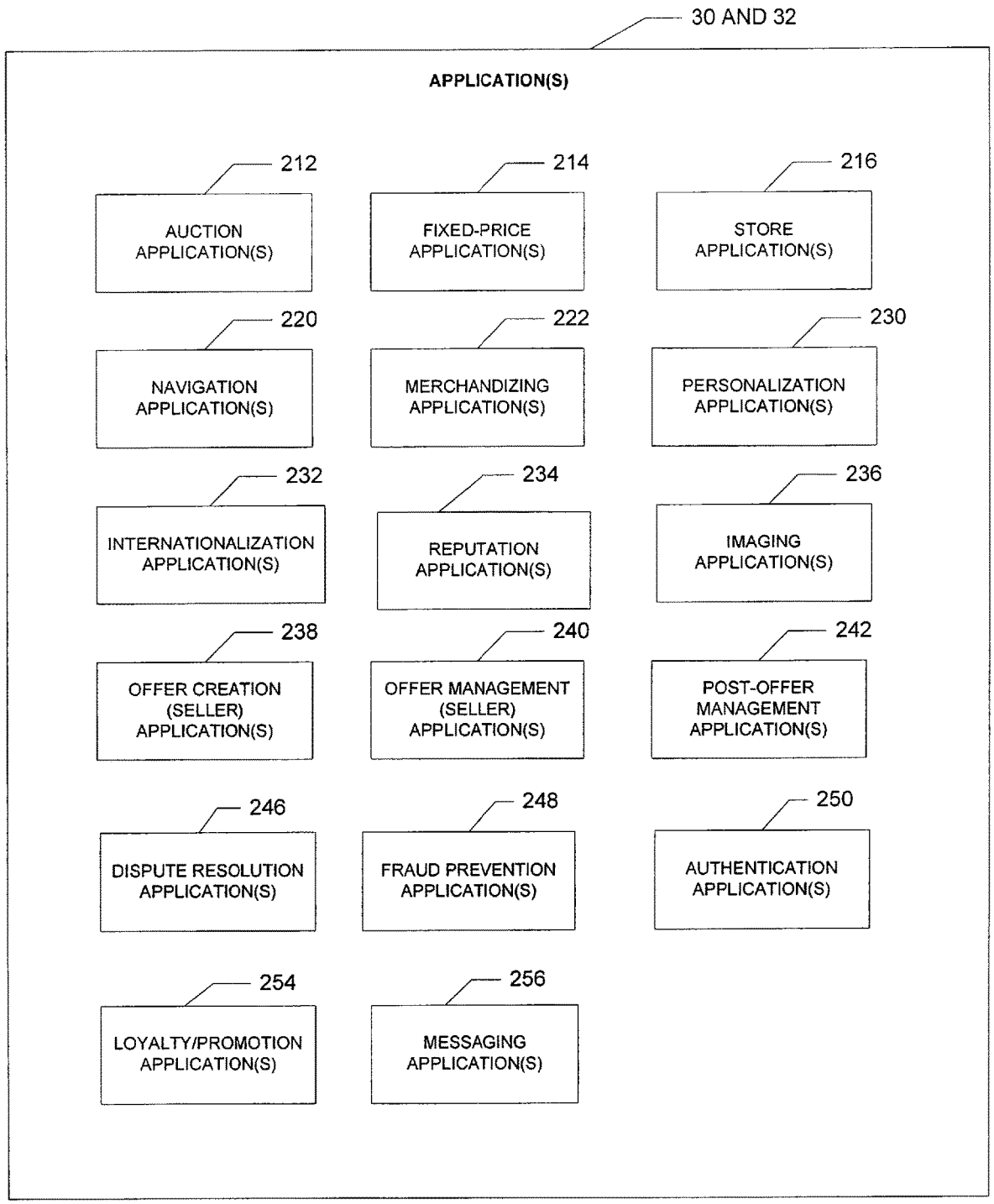
FIG. 2 illustrates a block diagram showing marketplace and payment application(s) in an example embodiment.

FIG. 2 illustrates a block diagram showing application server(s) that are part of the network-based system 112, in an example embodiment of the present invention. In this embodiment, the marketplace application(s) 130, and the payment application(s) 132 may be hosted by the application server(s) 128 of the network-based system 112. The applications 130 and 132 may be hosted on dedicated or shared server machines (not shown) that are communicatively coupled to enable communications between server machines. The applications themselves may be communicatively coupled (e.g., via appropriate interfaces) to each other and to various data sources, so as to allow information to be passed between the applications or so as to allow the applications to share and access common data.

The marketplace applications 130 are shown to include at least one or more auction applications 212 which support auction-format listing and price setting mechanisms (e.g., English, Dutch, Vickrey, Chinese, Double, Reverse auctions etc.). The auction applications 212 may also provide a number of features in support of such auction-format listings, such as a reserve price feature whereby a seller may specify a reserve price in connection with a listing and a proxy-bidding feature whereby a bidder may invoke automated proxy bidding. The auction-format offer in any format may be published in any virtual or physical marketplace medium and may be considered the point of sale for the commerce transaction between a seller and a buyer (or two users).

One or more fixed-price application(s) 214 support fixed-price listing formats (e.g., the traditional classified advertisement-type listing or a catalogue listing) and buyout-type listings. Specifically, buyout-type listings (e.g., including the Buy-It-Now® (BIN) technology developed by eBay Inc., of San Jose, California) may be offered in conjunction with auction-format listings, and allow a buyer to purchase goods or services, which are also being offered for sale via an auction, for a fixed-price that is typically higher than the starting price of the auction.

The application(s) of the application server 128 may include one or more store application(s) 216 that allow a seller to group listings within a "virtual" store. The virtual store may be branded and otherwise personalized by and for the seller. Such a virtual store may also offer promotions, incentives and features that are specific and personalized to a relevant seller.

Navigation of the online marketplace may be facilitated by one or more navigation applications 220. For example, a search application (as an example of a navigation application) may enable key word searches of listings published via the networked system 112. A browse application may allow users to browse various category, catalogue, or inventory data structures according to which listings may be classified within the networked system 112. Various other navigation applications may be provided to supplement the search and browsing applications.

Merchandizing applications 222 support various merchandising functions that are made available to sellers to enable sellers to increase sales via the networked system 112. The merchandizing applications 222 also operate the various merchandising features that may be invoked by sellers, and may monitor and track the success of merchandising strategies employed by sellers.

Personalization applications 230 allow users of the networked system 112 to personalize various aspects of their interactions with the networked system 112. For example, a user may, utilizing an appropriate personalization application 230, create a personalized reference page at which information regarding transactions to which the user is (or has been) a party may be viewed. Further, the personalization application(s) 230 may enable a third party to personalize products and other aspects of their interactions with the system 112 and other parties, or to provide other information, such as relevant business information about themselves.

The marketplace applications 130 may include one or more internationalization applications 232. In one embodiment, the network-based system 112 may support a number of marketplaces that are customized, for example, for specific geographic regions. A version of the system 112 may be customized for the United Kingdom, whereas another version of the system 112 may be customized for the United States. Each of these versions may operate as an independent marketplace, or may be customized (or internationalized) presentations of a common underlying marketplace. The networked system 112 may accordingly include a number of internationalization applications 232 that customize information (and/or the presentation of information) by the networked system 112 according to predetermined criteria (e.g., geographic, demographic or marketplace criteria). For example, the internationalization applications 232 may be used to support the customization of information for a number of regional web sites that are operated by the networked system 112 and that are accessible via respective web servers.

Reputation applications 234 allow users that transact, utilizing the networked system 112, to establish, build and maintain reputations, which may be made available and published to potential trading partners. Consider that where, for example, the networked system 112 supports person-to-person trading, users may otherwise have no history or other reference information whereby the trustworthiness and credibility of potential trading partners may be assessed. The reputation applications 234 allow a user, for example through feedback provided by other transaction partners, to establish a reputation within the networked system 112 over time. Other potential trading partners may then reference such a reputation for the purposes of assessing credibility and trustworthiness.

In order to make listings, available via the networked system 112, as visually informing and attractive as possible, the marketplace applications 130 may include one or more imaging applications 236 utilizing which users may upload images for inclusion within listings. An imaging application 236 also operates to incorporate images within viewed listings. The imaging applications 236 may also support one or more promotional features, such as image galleries that are presented to potential buyers. For example, sellers may generally pay an additional fee to have an image included within a gallery of images for promoted items.

The marketplace applications 130 may include one or more offer creation applications 238. The offer creation applications 238 allow sellers conveniently to author products pertaining to goods or services that they wish to transact via the system 112. Offer management applications 240 allow sellers to manage offers, such as goods, services, or donation opportunities. Specifically, where a particular seller has authored and/or published a large number of products, the management of such products may present a challenge. The offer management applications 240 provide a number of features (e.g., auto-reproduct, inventory level monitors, etc.) to assist the seller in managing such products. One or more post-offer management applications 242 also assist sellers with a number of activities that typically occur post-offer. For example, upon completion of an auction facilitated by one or more auction applications 212, a seller may wish to leave feedback regarding a particular buyer. To this end, a post-offer management application 242 may provide an interface to one or more reputation applications 234, so as to allow the seller conveniently to provide feedback regarding multiple buyers to the reputation applications 234.

The dispute resolution application(s) 246 may provide mechanisms whereby disputes arising between transacting parties may be resolved. For example, the dispute resolution applications 48 may provide guided procedures whereby the parties are guided through a number of steps in an attempt to settle a dispute. In the event that the dispute cannot be settled via the guided procedures, the dispute may be escalated to a mediator or arbitrator.

The fraud prevention application(s) 248 may implement various fraud detection and prevention mechanisms to reduce the occurrence of fraud within the system 112. The fraud prevention application(s) may prevent fraud with respect to the third party and/or the client user in relation to any part of the request, payment, information flows and/or request fulfillment. Fraud may occur with respect to unauthorized use of financial instruments, non-delivery of goods, and abuse of personal information.

Authentication application(s) 250 may verify the identity of a user, and may be used in conjunction with the fraud prevention application(s) 248. The user may be requested to submit verification of identity, an identifier upon making the purchase request, for example. Verification may be made by a code entered by the user, a cookie retrieved from the device, a phone number/identification pair, a username/password pair, handwriting, and/or biometric methods, such as voice data, face data, iris data, finger print data, and hand data. In some embodiments, the user may not be permitted to login without appropriate authentication. The system (e.g., the FSP) may automatically recognize the user, based upon the particular network-based device used and a retrieved cookie, for example.

The network-based system 112 itself, or one or more parties that transact via the system 112, may operate loyalty programs and other types of promotions that are supported by one or more loyalty/promotions applications 254. For example, a buyer/client user may earn loyalty or promotions points for each transaction established and/or concluded with a particular seller/third party, and may be offered a reward for which accumulated loyalty points can be redeemed.

The application server(s) 128 may include messaging applications 256. The messaging applications 256 are responsible for the generation and delivery of messages to client users and third parties of the network-based system 112. Information in these messages may be pertinent to services offered by, and activities performed via, the payment application(s) 132.

Such messages, for example, advise client users regarding the status of products (e.g., providing "out of stock" or "outbid" notices to client users) or payment status (e.g., providing receipt for payment, Notification of a Payment Received, delivery status, invoice notices). Third parties may be notified of a product order, payment confirmation and/or shipment information. Respective messaging applications 256 may utilize any one of a number of message delivery networks and platforms to deliver messages to users. For example, messaging applications 256 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Data Structures

Figure 3:
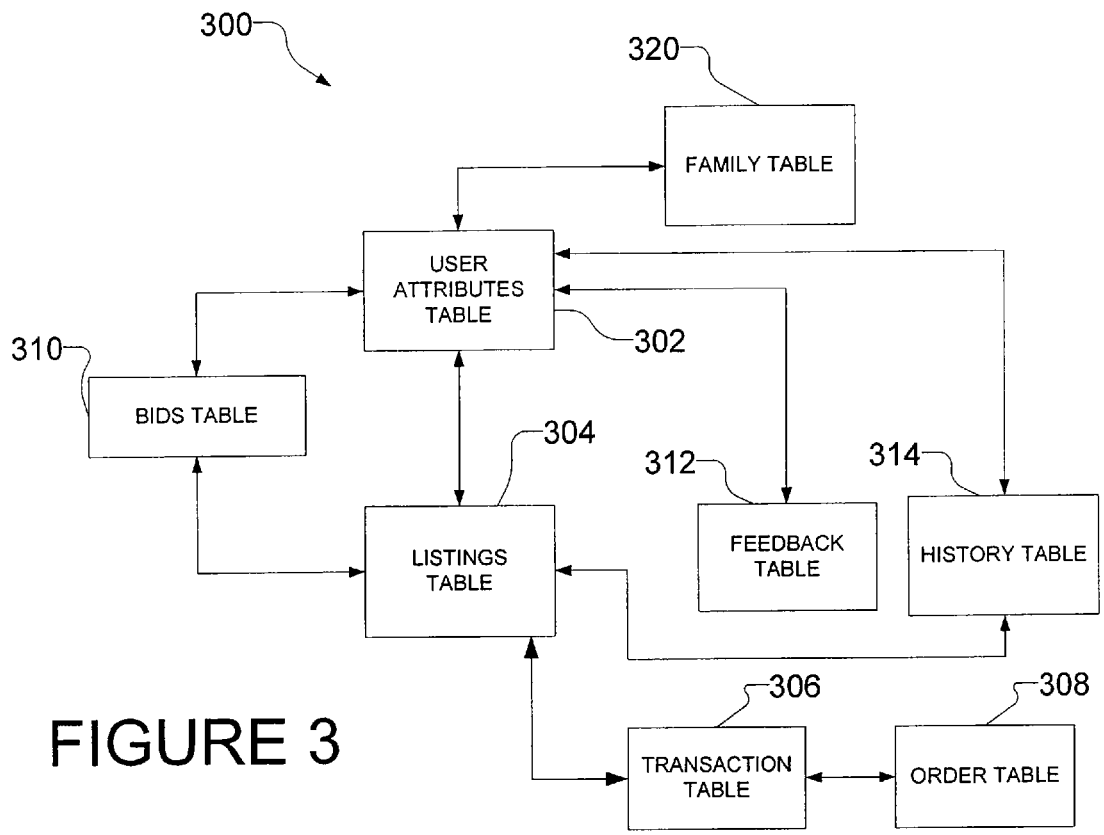
FIG. 3 illustrates a high-level entity-relationship diagram, illustrating various tables that may be maintained within one or more databases, according to an example embodiment.

FIG. 3 illustrates a high-level entity-relationship diagram, having various tables 300 that may be maintained within the database(s) 136 according to an example embodiment. The tables 300 may be utilized by and support the application(s) of the application server(s). The database(s) 136 may, in one embodiment, be implemented as a relational database, and includes a number of tables having entries, or records, that are linked by indices and keys. In an alternative embodiment, the database(s) 136 may be implemented as a collection of objects in an object-oriented database.

A user attributes table 302 contains a record for each registered user of the networked system 112. A user may operate as a seller, merchant, a buyer, or any combination, within the networked system 112. In one example embodiment, a buyer may be a user that has accumulated value (e.g., commercial or proprietary currency), and is accordingly able to exchange the accumulated value for items that are offered for sale by the networked system 112. The user attribute may be selected from a group including: number of feedbacks obtained, positive feedback percentage, verifiable street address on file, time on file (length of time), associated country, listings, user identification information, shipping and/or billing address information (including default address), financial instrument information (including default payment method, currency information), and other information (e.g. wireless carrier) pertaining to each such registered user.

The tables 300 also include an listings or items table 304 in which are maintained item records for goods and services that are available to be, or have been, transacted via the networked system 112. Each item record within the items table 304 may furthermore be linked to one or more user records within a user table 302, so as to associate a seller and one or more actual or potential buyers with each item record.

A transaction table 306 contains a record for each transaction (e.g., a purchase or sale transaction) pertaining to items for which records exist within the items table 304. In addition to transactions taking place between users on the system, the transaction table 306 may include a record for the specific transaction (e.g., a purchase transaction) under consideration. The transaction table 306 may include information such as the user, the category or other listing features, status, price paid, date, and other transaction-related information.

An order table 308 is populated with order records, each order record being associated with an order. Each order, in turn, may be with respect to one or more transactions for which records exist within the transaction table 306.

Bid records within a bids table 310 each relate to a bid received at the networked system 112 in connection with an auction-format listing supported by an auction application 212. A feedback table 312 is utilized by one or more reputation applications 234, in one example embodiment, to construct and maintain reputation information concerning users. A history table 314 maintains a history of transactions to which a user has been a party. One or more attributes tables 316 record attribute information pertaining to items for which records exist within the items table 304. Considering just a single example of such an attribute, the attributes tables 316 may indicate a currency attribute associated with a particular item, the currency attribute identifying the currency of a price for the relevant item as specified in by a seller.

User Interface

Figure 4:
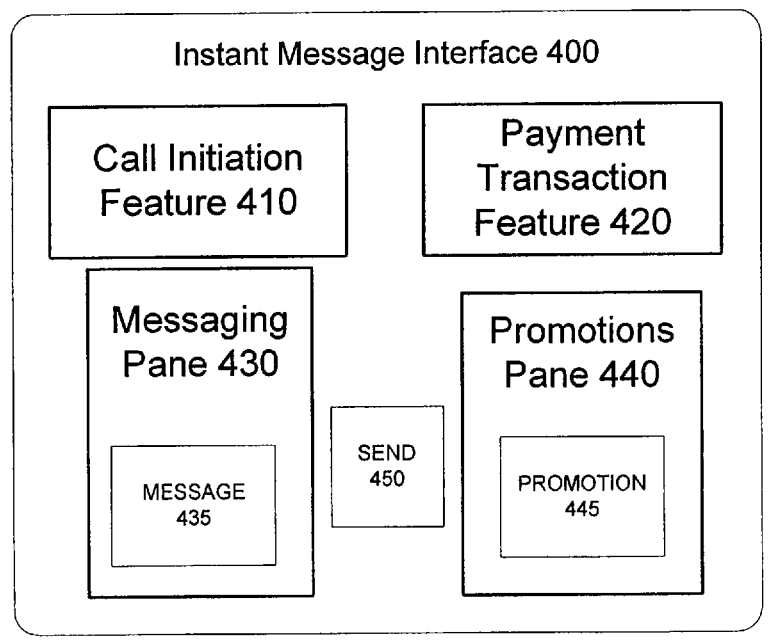
FIG. 4 illustrates an interface in an example embodiment.

FIG. 4 illustrates a user interface 400 in an example embodiment. The interface 400 may be an interface on the network-based device, such a notebook computer or a mobile phone. The interface 400 may include an "instant message" interface to allow the user to receive and write messages in near real-time. The interface may also the user to sign up for services, such as those of the financial service provider, and receive status notifications.

The interface may include a call initiation feature 410, a payment transaction feature 420, a messaging pane 430 to display a message 435 received and/or written, and a promotions pane 440 to publish a promotion 445 from a third party merchant, for instance. The interface 400 may also include a "send" feature 450 to select upon entering the message 435 within the messaging pane 430 to 'send' the message to another party or user.

Status notifications may be published to the user in the messaging pane 430 of the messaging interface 400. The status notification may be triggered when selected states occur to the user's account associated with the financial service provider, or associated with an online merchant, for example. The user may select what types of status notifications to receive via the interface 400. Status notifications may be associated with payment status, fraud watch or other alerts, online auction won, invoice, and change in FSP account status, for instance.

The user may set up a profile associated with the FSP via IM, for instance. The profile may reflect the user selection regarding a service level, or level of integration between what is happening in their FSP account and what information is passed along to the user regarding the account, through IM for instance. The user may select an option to pay via instant messaging and/or be paid via instant messaging. Further, the user may make a selection to open up their IM sessions for promotional offers as presented by the merchant (possibly in the promotions pane 440 or even in the messaging pane 430 of the interface 400). In addition, users (e.g., a third party merchant) may make a selection in their profile to allow users to pay them through the IM server.

Figure 7:
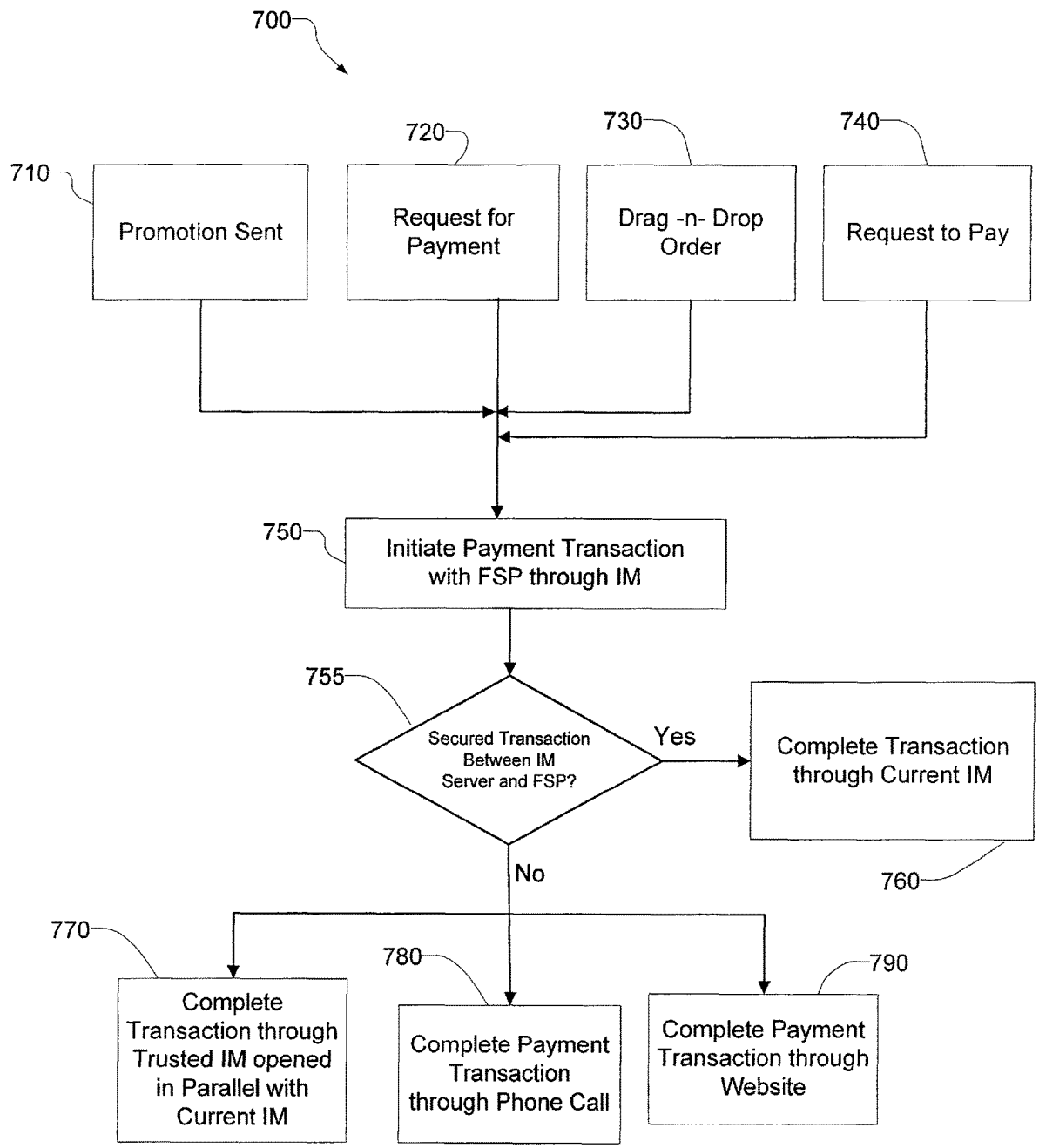

The call initiation feature 410 of the interface 400 may be associated with block 780 of the method of FIG. 7, described herein, where a payment transaction associated with the message 435 may be completed through a telephone call. The call initiation feature 410 may be associated with voice over internet protocol (VoIP) technology. Payment information, such as credit card information, account numbers, shipping and/or billing addresses, may be given over the telephone call. The call initiation feature 410 may be activated when there may be a security concern between the instant messaging server and the payment application.

The payment transaction feature 420 may receive a payment transaction request in association with text in the message 435 in the messaging pane 430. The payment transaction feature 420 may be selected by the user upon submission of associated text in the message 435.

In order for the payment transaction to be completed, there may be user identity verification. The messaging interface 400 may receive a user identifier, associated with the network-based device, and the payment application may determine an identity of the user utilizing the user identifier. Account number information, billing address and/or shipping address may be associated with the user identifier. Thus, the identifier may be used to complete the transaction.

The payment transaction feature 420 may initiate the payment process, or may be used to complete the payment process in the instance where the transaction between the IM server and the payment application is substantially secure. When the payment transaction feature 420 is used to initiate the payment process, to complete the transaction, (1) a 'trusted' IM server, e.g., Skype® may open in parallel on the client machine 120 to confirm the payment transaction, (2) a phone number associated with the payment application may be published, for example, in the messaging pane 430, for the user to call, and/or (3) any other substantially secure means may be used. User identification may be verified during transaction completion.

Flowcharts

Figure 5:
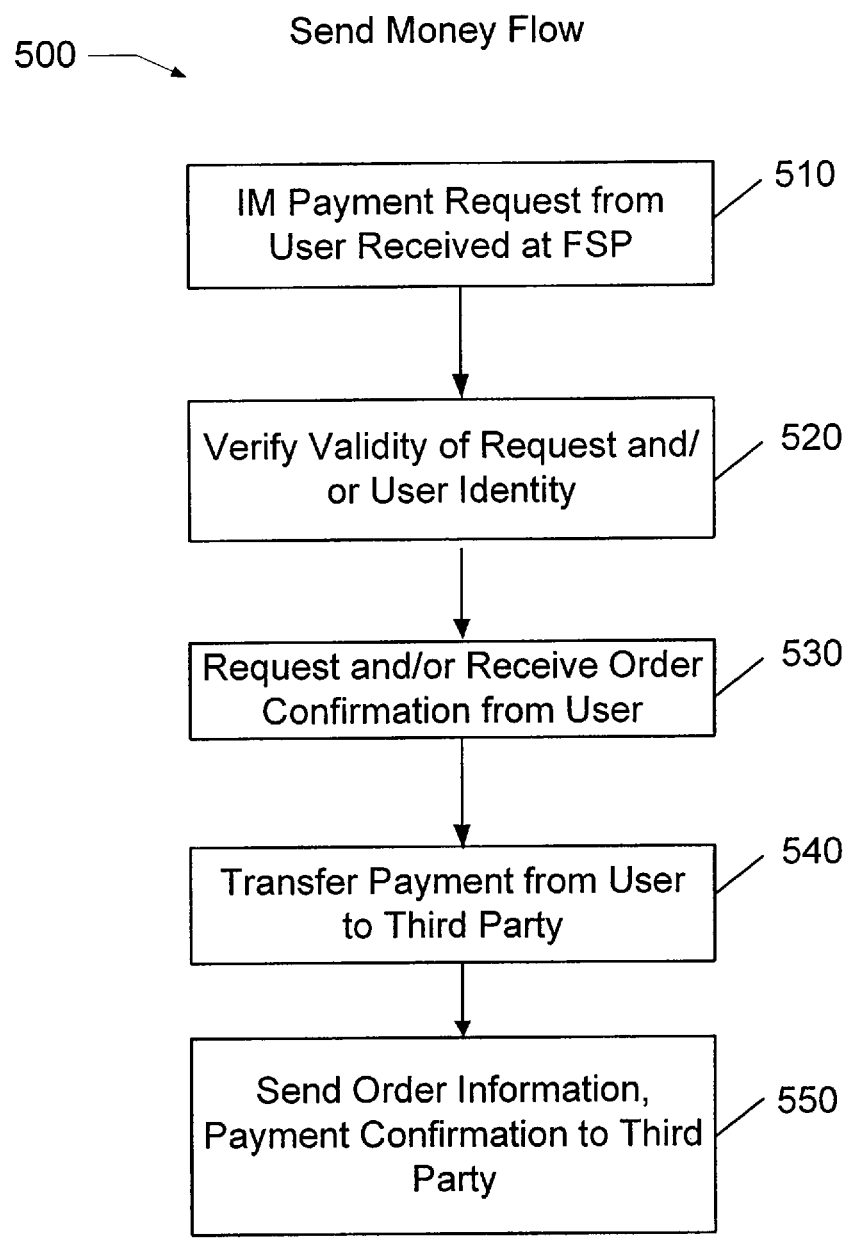
FIGS. 5, 6 and 7 illustrate flow charts of payment transaction methods, according to an example embodiment of the present invention.

FIG. 5 illustrates a flow chart of a payment transaction method 500 (e.g., "send money" flow), according to an example embodiment of the present invention. In response to submitting a payment initiation request, the system may optionally automatically transfer payment from the user to the third party via the FSP. In embodiments, 'automatically' may refer to the following: no other action on the part of the user is taken to pay the third party other than submission of the purchase initiation code/key through the send feature 450 or activation of the payment transaction feature 420. This automatic payment transfer may include the client user and/or the client user device registering or pre-registering with the FSP, for instance. The user may be a confirmed or a pre-confirmed client user within the user table 302. The system may connect with the FSP, and may optionally receive/authenticate user identification (e.g., login & password or PIN), before transferring payment. The FSP may receive confirmation from the user regarding the order before payment is transferred. The purchase initiation code and/or the order may be verified by the FSP and/or the user, before payment is transferred.

The method 500 includes, at block 510, an instant message payment request from the user received at the FSP. The payment request may be a purchase request or a request for a payment (e.g., an invoice) to open a communication session between the user and the FSP. The FSP may open communication with the user in the "background," such that there may be a second communication session opened with the financial service provider while the user remains connected with the third party through a web site, or through a secure instant messaging server, or through a phone call, or other means.

The payment request itself may be made by any known means, including the means described herein. In one instance, a "handle" may be communicated in clear text between parties to initiate a payment transaction through any number of communication interfaces, IM for example. After the 'handle' (or code) is entered into the message 435, the send button 450 may be selected to forward the code to the other party, in an example. In another instance, the payment transaction feature 420 may be selected to initiate the payment transaction. However the transaction is initiated, it may be completed through a secure channel, for instance at blocks 760, 770, 780 or 790 of FIG. 7, discussed herein.

At block 520, the validity of the request may be verified. For example, verification of whether there is a valid and/or available product or service associated with the request made by the FSP and/or the third party merchant. Further, verification of the status of a third party associated with that product or service may be performed. The payment application(s) may also communicate with a database associated with the third party server or the database server(s) 134 to determine if the product, service, or promotion is still available and/or is in stock.

In addition or alternatively, the user identity may be verified, for example, for security purposes. User verification or authentication may include a user log in code, wherein the code includes, for example, a telephone number/identification pair, a username/password pair, handwriting, and/or biometric methods, such as voice data, face data, iris data, finger print data, and hand data. In some embodiments, the user may not be permitted to login without appropriate authentication.

The system (e.g., the FSP) may alternatively automatically recognize the user, based upon the particular network-based device used, for example. Additionally, the system may automatically authorize the user to conduct transactions upon connection with the FSP. The FSP may automatically recognize the user from a cookie that has been previously deposited on the network-based device. In another example, the FSP may automatically recognize the user using any other method, including, a device telephone number, a device serial number, voice recognition, caller ID code retrieved from the device, or any other identification type.

At block 530, order confirmation may be requested from the user. The user may respond/confirm to the financial service provider regarding the order. The application server(s) may send a message to the client user requesting confirmation of the specific product, service, donation opportunity or promotion associated with the purchase initiation code submitted, the payment details, and/or the shipment information.

At block 540, payment may be transferred from the user to the third party via the financial service provider. Using an embodiment of the method described, the security of the client user may be maintained with respect to the third party, while conducting order transactions in a relatively quick, open communication session.

At block 550, order confirmation may be sent to the user. A receipt and/or another type of payment or order confirmation may be sent to the user. Further, payment confirmation may be sent by the FSP to the third party. Shipment information may be provided by the FSP to the third party and/or the user. The shipment information may accompany the payment confirmation. The third party may optionally process the order, and optionally ship (or otherwise provide) the product, service, or donation, if applicable. The product and/or receipt may be physically received at the default address destination of the client user. Additionally or alternatively, the client user may receive an electronic confirmation, such as a receipt or a voucher for a service or donation, via e-mail, web page update, device application update, a voicemail message, a text message, and/or a telephone message. The shipment/receipt may alternatively or additionally be sent by the application server(s). For example, the shipment may include a message sent to the network-based device, such as a link to download an application that is ordered by the client user, a message including a code to access a service that is ordered, or a message including ordered information, such as stock purchase information. In an embodiment where a donation is made, for instance, there may be no shipment and there may be a receipt sent to the user.

Figure 6:
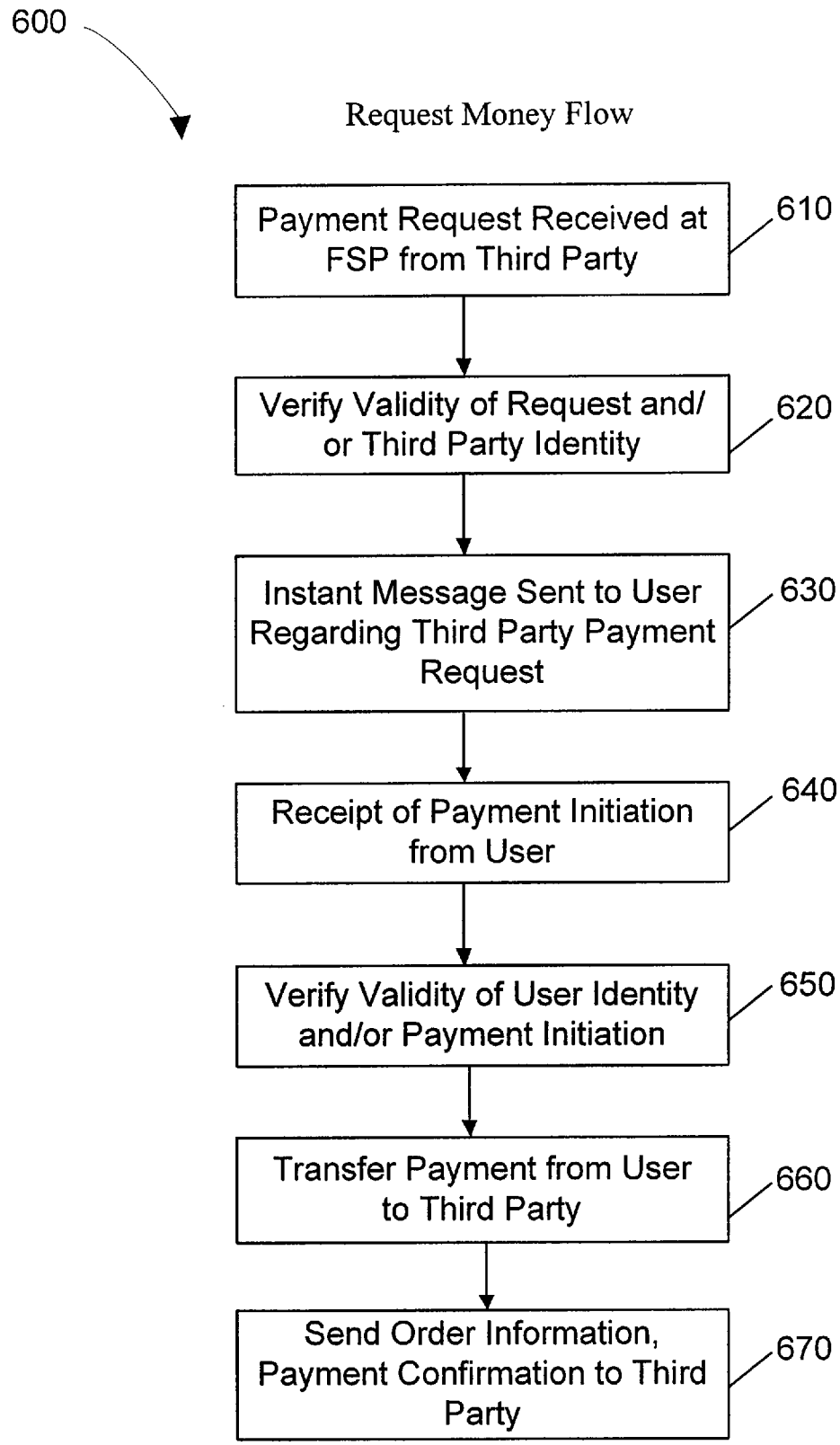

FIG. 6 illustrates a flow chart of a payment transaction method 600 (e.g., "Request money" flow), according to an example embodiment of the present invention. In this instance, the third party (who may or may not be associated with a product or service) may make a payment request. The payment request may be a request for payment to be made to the third party from the user of the instant messaging service.

The method 600 includes, at block 610, a payment request by a third party received at the FSP. The payment request may be a request for payment to be made to the third party from the user of the instant messaging service. The payment request may be an invoice, such as one generated through the use of PayPal®.

At block 620, the validity of the request may be verified in a manner similar to that described with respect to block 520. In addition or alternatively, the third party identity may be verified, for example, for security purposes. Verification of the user (e.g., third party) and/or the request may be made by any known means, including the means described herein with respect to block 520, for instance.

At block 630, an "instant message" may be sent to the user regarding the payment request from the third party.

At block 640, the user may initiate payment and the system may receive the payment initiation. Payment initiation may be completed through the payment transaction feature 420 in the interface 400, for instance, or by any other means, as described herein, for instance.

At block 650, the validity of the payment initiation may be verified. In addition or alternatively, the user identity may be verified, for example, for security purposes. Verification may be completed in a manner similar to that described with respect to block 520.

At block 660, payment may be transferred from the user to the third party via the financial service provider as described herein.

At block 670, order confirmation and/or a payment receipt may be sent to the user in a manner similar to that described with respect to block 550.

FIG. 7 illustrates a flow chart of a method 700, according to an example embodiment of the present invention. The method 700 illustrates various methods a user may use to place an order, for example at blocks 710-740. The method 700 may also illustrate various methods to complete the transaction securely, for example at blocks 760 to 790.

At block 710, a merchant, such as an online merchant, may publish a promotion to the user of the instant messaging session. The promotion may be associated with a purchase request. The promotion may be displayed in the messaging pane 430 as part of a chat session through instant messaging, for instance. In an additional embodiment, the promotion may be displayed in the promotion pane 440 to minimize intrusion to the user. The network-based system 112 and/or the online merchant may "listen in" on the chat session between the user and another party, and display promotions that are relevant to a conversation or key words in that conversation. The promotion may include a URL link, or a "key" to type into the message 435, or another way to initiate a payment transaction as described herein.

The promotion may be targeted to the user based on attributes of the user, per the database tables. The online merchant may request, purchase and/or receive the user attribute data from the application(s) 128. Using user attribute data, the online merchant may offer promotions to the user that might be of specific interest to them, or general interest.

The user may opt-in to have promotions sent to them by giving access of their specific attributes, such as purchase or search history, to online merchants or to particular online merchants, such as those that are "trusted" by the user and/or those that already have an established business relationship with the user. The online merchants may be the third party client that has an account with the network-based system 112. The flow chart may progress from block 710 to block 750.

At block 720, the merchant may send a request for payment to the user through instant messaging protocol. The merchant may be considered the third party as described with respect to FIG. 6. The flow chart may progress from block 720 to block 750.

At block 730, the user may drag & drop an order section of an online marketplace. The order section may be inserted or 'dropped' into the messaging pane 430, for instance, or any payment flow associated with the user. The order section may be cut from the website buffer of the online merchant, for instance. The flow chart may progress from block 730 to block 750.

At block 740, the user may view a displayed offer to purchase. The offer may be displayed in an online marketplace, for instance. The offer, such as a "key" associated with a particular product, may be entered into the messaging pane 430 of the chat session by the user, for instance. In another embodiment, the offer may be automatically entered into the messaging pane 430 by selecting a feature associated with the offer, especially when the offer is associated with the financial service provider and/or the provider of the interface 400.

At block 750, the payment transaction may be requested through the instant message session. The payment transaction request may be initiation of payment with the payment application (e.g., the financial service provider), either to send payment or to receive payment (such as an invoice) as described with regard to block 510 herein. In one embodiment, the payment transaction feature 420 of the IM interface 400 may be activated, as described herein, to request a payment transaction, such as to initiate payment. The online merchant of block 710, 720 or 740, for instance, may have an account with the network-based system 112 to accept the transaction associated with the purchase initiation. Verification of the merchant account and any associated offer may be completed as described herein, at FIGS. 5 and 6, for example. The payment transaction request may be associated with the "cut" order summary, or the promotion displayed, for example.

At query 755, a determination may be made concerning whether the transaction between the IM server and the payment application is secure. The determination may be made by the system, for example by the FSP. In the instance where the transaction is secure, the method advances to block 760. When the transaction is not secure, the method may advance to one of blocks 770, 780 or 790, for instance for transaction completion. Transaction completion may include user identification authentication, and verification of an order associated with the payment, for instance. The fraud prevention application(s) 248 may make the determination whether the connection between the messaging server and the financial service provider is secure on a case by case basis for each transaction.

At 760, the payment transaction with the payment application may be completed within and through the current instant messaging server. For example, passwords or other sensitive information may be exchanged between the user and the financial service provider using the instant messaging server because the connection between the payment application and the messaging server is substantially secure and known. An instance where the transaction between the IM server and the payment application is secure may include use of the system 112 including both the MS Gateway server 125 and the payment application(s) 132 in the same (secure) communication environment.

At 770, the payment transaction with the payment application may be completed within and through a separate instant messaging server other than the current instant messaging server, upon payment initiation. For example, passwords or other sensitive information may not be exchanged between the user and the FSP using the current instant messaging server because the connection between the payment application and the messaging server is not substantially secure. The separate instant messaging server may be considered "trusted" in that there is a connection between the payment application and the separate messaging server that is substantially secure and known. The separate instant messaging server may have an interface that opens or launches in parallel to or instead of the current instant messaging server in order to receive sensitive information to complete the transaction.

At 780, the payment transaction with the payment application may be completed within and through a phone call, upon payment initiation. A callback mechanism may be initiated where the initial text request (e.g., the payment initiation request) in the IM server includes information (or a code) for the payment application to call the user back, for instance, to initiate a secure, encrypted communication channel in which to complete the transaction. The phone call may be considered "trusted" in that there is a connection between the payment application and the phone call that is substantially secure and known. The phone call may include an internet connection to communicate voice data using internet protocol (Voice over internet protocol (VoIP)), a call via a land-line, a mobile telephone call, or any other means to make a phone call. The VoIP may be through the instant message server or any another network means. The phone call may be automatically initiated by the payment application in response to the payment initiation, or a phone number may be published in the message 435 for the user to call, or the phone number may be automatically dialed for the user to connect to the payment application for transaction completion.

At 790, the payment transaction with the payment application may be completed within and through a web site, upon payment initiation. A URL web link may be sent through the current instant messaging server, for example, and published to the messaging pane 430. The user may "click" on the link to launch the website or may "cut and paste" the link into the web browser window. The web site may be associated with the payment application. The payment transaction may be completed securely at the web site.

Platform Architecture

Figure 8:
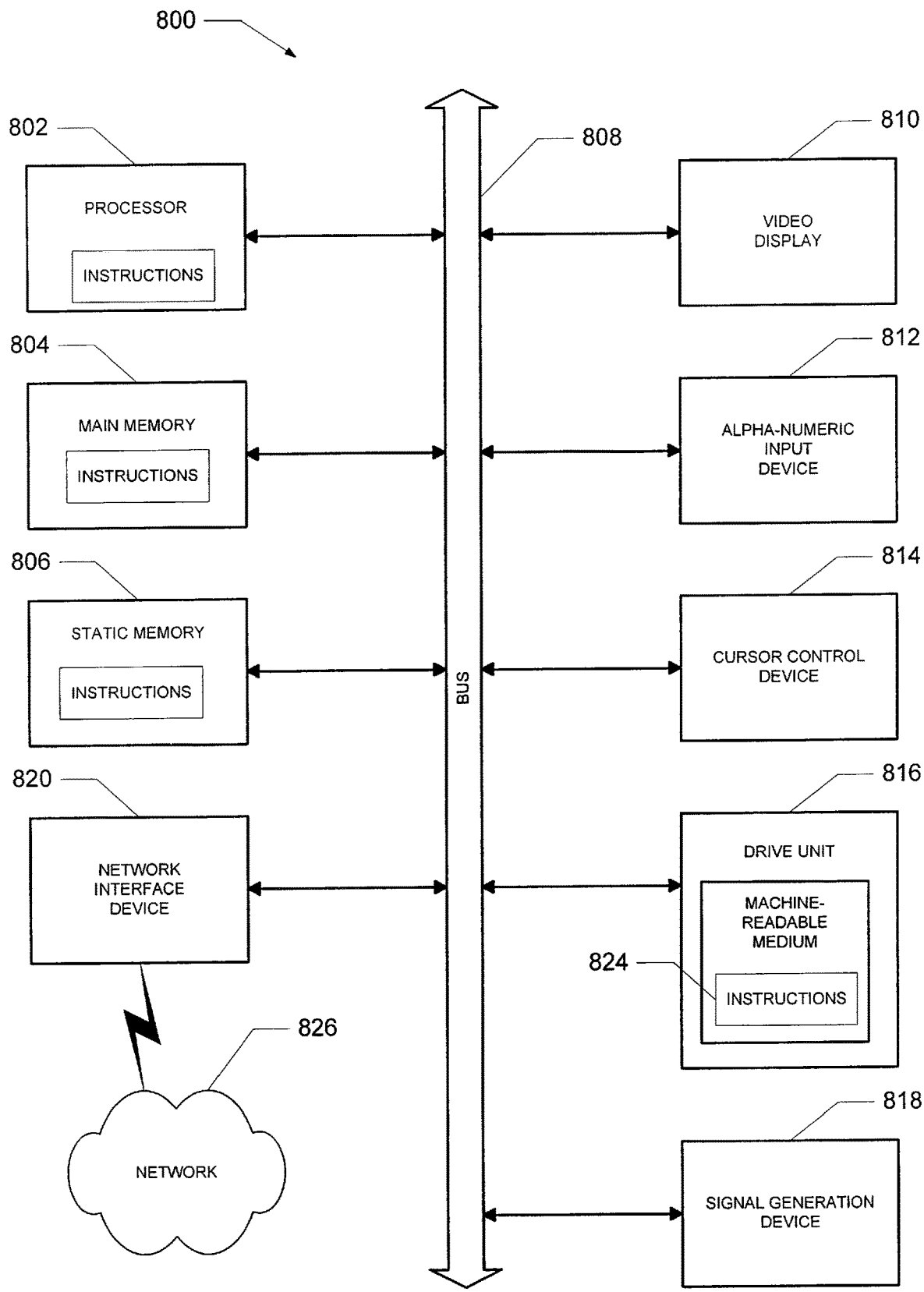
FIG. 8 illustrates a diagrammatic representation of a machine in the form of a computer system within which a set of instructions, for causing the machine to perform any one or more of the methodologies discussed herein, may be executed, according to an example embodiment.

FIG. 8 shows a diagrammatic representation of a machine in the example form of a computer system 800 within which a set of instructions, for causing the machine to automatically perform any one or more of the methodologies discussed herein, may be executed. In alternative embodiments, the machine operates as a standalone device or may be connected (e.g., network) to other machines. In a network deployment, the machine may operate in the capacity of a server or a client user machine in server-client user network environment, or as a peer machine in a peer-to-peer (or distributed) network environment. The machine may be a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a television, television cable a pager, a personal trusted device, a web appliance, a network router, switch or bridge, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of electronically-coded instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD)

or a cathode ray tube (CRT)). The computer system 800 also includes an input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of electronically-coded instructions (e.g., software 824) embodying any one or more of the methodologies or functions described herein. The instructions 824 may also reside, completely or at least partially, within the main memory 804, the static memory 806, and/or within the processor 802 during execution thereof by the computer system 800. The main memory 804 and the processor 802 also may constitute machine-readable media.

The instructions 824 may further be transmitted or received over a network 826 via the network interface device 820.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGS. 1 to 8 are merely representational and may not be drawn to scale. Certain proportions thereof may be exaggerated, while others may be minimized.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the examples of dimensions and ranges are considered typical, the various embodiments are not limited to such dimensions or ranges.

The Abstract is provided to comply with 37 C.F.R. § 1.74(b) to allow the reader to quickly ascertain the nature and gist of the technical disclosure. The Abstract is submitted with the understanding that it will not be used to interpret or limit the scope or meaning of the claims. In the Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

What is claimed is:

1. A marketplace service provider system, comprising:
   one or more processors; and
   one or more computer-readable memories having program instructions stored thereon that are executable by the one or more processors to cause the marketplace service provider system to perform operations comprising:
   establishing, via a Webbot, a chat session facilitated by an instant messaging host server with a user device, wherein the Webbot is a dynamic webpage object executed by a marketplace application of the marketplace service provider system, executing on the user device;
   detecting information received from the user device via the Webbot and during the chat session corresponding to a purchase request for an item from a marketplace service provider associated with the marketplace service provider system, wherein the information includes a code of the instant messaging host server;
   receiving, via the Webbot during the chat session, an encrypted identifier from the user device, wherein the encrypted identifier is encrypted by the Webbot prior to transmission and corresponds to a financial account, of a user of the user device, with a payment service provider, wherein the encrypted identifier protects the financial account by providing information of the user associated with the payment service provider without providing financial information of the user to the marketplace service provider system, wherein the information and the encrypted identifier received from the user device via the chat session are received from the Webbot, and wherein the Webbot facilitates secure communications between the instant messaging host server and the marketplace application executed by the marketplace service provider system; and
   transmitting the encrypted identifier and the code of the instant messaging host server to the payment service provider, wherein the code is usable by the payment service provider to initiate a secure, encrypted communication channel with the user of the user device via the instant messaging host server in which to complete the purchase of the item, and wherein the encrypted identifier is usable by the payment service provider to access the financial account of the user to cause a payment to be made from the financial account of the user for the purchase of the item.

2. The marketplace service provider system of claim 1, wherein the payment is made to a third-party account, the third-party account corresponding to an entity that is different than a marketplace service provider associated with the marketplace service provider system.

3. The marketplace service provider system of claim 1, wherein the encrypted identifier further protects the financial account by providing information of the user without providing an account number of the financial account to which the encrypted identifier corresponds.

4. The marketplace service provider system of claim 1, the operations further comprising:
receiving, from the user device via the chat session, credential information corresponding to the user of the financial account; and
transmitting, to the payment service provider, the credential information, wherein the credential information is usable by the payment service provider to verify the identity of the user by validating the received credential information; and
receiving, from the payment service provider via a different chat session established between the marketplace service provider system and the payment service provider, a confirmation message for the purchase request that indicates, based on verifying the identity of the user, that the purchase request has been authorized.

5. The marketplace service provider system of claim 1, the operations further comprising:
identifying a reputation score associated with a user associated with the user device; and
providing the reputation score to the payment service provider.

6. The marketplace service provider system of claim 5, wherein the causing the payment to be made from the financial account of the user for the purchase of the item includes utilizing a credit provided by the payment service provider for the payment, wherein the credit is provided based on the reputation score provided by the marketplace service provider system.

7. The marketplace service provider system of claim 1, the operations further comprising:
providing an offer to a user of the user device based on the purchase of the item.

8. A method comprising:
establishing, by a marketplace service provider system via a Webbot, a chat session facilitated by an instant messaging host server with a user device, wherein the Webbot is a dynamic webpage object executed by a marketplace application of the marketplace service provider system, executing on the user device;
detecting, by the marketplace service provider system, information received from the user device via the Webbot and during the chat session corresponding to a purchase request corresponding to a purchase of an item from the marketplace service provider system, wherein the information includes a code of the instant messaging host server;
receiving, by the marketplace service provider system via the Webbot and during the chat session, an encrypted identifier from the user device, wherein the encrypted identifier is encrypted by the Webbot prior to transmission and corresponds to a financial account of a user of the user device with a payment service provider, wherein the encrypted identifier protects the financial account by providing information of the user associated with the payment service provider without providing financial information of the user to the marketplace service provider system, wherein the information and the encrypted identifier received from the user device via the chat session are received from the Webbot, and wherein the Webbot facilitates secure communications between the instant messaging host server and the marketplace application executed by the marketplace service provider system; and
transmitting, by the marketplace service provider system, the encrypted identifier and the code of the instant messaging host server to the payment service provider, wherein the code is usable by the payment service provider to initiate a secure, encrypted communication channel with the user of the user device via the instant messaging host server in which to complete the purchase of the item, and wherein the encrypted identifier is usable by the payment service provider to access the financial account of the user to cause a payment to be made from the financial account of the user for the purchase of the item.

9. The method of claim 8, wherein the payment is made to a third-party account, the third-party account corresponding to an entity that is different than the marketplace service provider system.

10. The method of claim 8, wherein the encrypted identifier further protects the financial account by providing information of the user without providing an account number of the financial account to which the encrypted identifier corresponds, and wherein the chat session is established by an e-commerce service provider.

11. The method of claim 8, further comprising:
receiving, by the marketplace service provider system from the user device, credential information corresponding to the financial account; and
transmitting, to the payment service provider, the credential information.

12. The method of claim 8, further comprising:
identifying, by the marketplace service provider system, a reputation score associated with a user associated with the user device; and
providing, by the marketplace service provider system, the reputation score to the payment service provider.

13. The method of claim 12, wherein the causing the payment to be made from the financial account of the user for the purchase of the item includes utilizing a credit provided by the payment service provider for the payment, wherein the credit is provided based on the reputation score provided by the marketplace service provider system.

14. The method of claim 8, wherein the Webbot is a decentralized, dynamic Web page object that is located within the marketplace service provider system and enables secure communication between the marketplace service provider system and one or more other systems establishing chat sessions with the marketplace service provider system.

15. A non-transitory computer-readable medium having instructions stored thereon that are executable by a marketplace service provider system to perform operations comprising:
establishing, via a Webbot, a chat session facilitated by an instant messaging host server with a user device, wherein the Webbot is a dynamic webpage object executed by a marketplace application of the marketplace service provider system, executing on the user device;
detecting information received from the user device via the Webbot and during the chat session corresponding to a purchase request, the purchase request corresponding to a purchase of an item from the marketplace service provider system, wherein the information includes a code of the instant messaging host server;

receiving, via the Webbot and during the chat session, an encrypted identifier from the user device, wherein the encrypted identifier is encrypted by the Webbot prior to transmission and corresponds to a financial account of a user of the user device with a payment service provider, wherein the encrypted identifier protects the financial account by providing information of the user associated with the payment service provider without providing financial information of the user to the marketplace service provider system, wherein the information and the encrypted identifier received from the user device via the chat session are received from the Webbot, and wherein the Webbot facilitates communications between the instant messaging host server and the marketplace application executed by the marketplace service provider system; and transmitting the encrypted identifier and the code of the instant messaging host server to the payment service provider, wherein the code is usable by the payment service provider to initiate a secure, encrypted communication channel with the user of the user device via the instant messaging host server in which to complete the purchase of the item, and wherein the encrypted identifier is usable by the payment service provider to access the financial account of the user to cause a payment to be made from the financial account of the user for the purchase of the item.

16. The non-transitory computer-readable medium of claim 15, wherein the payment is made to a third-party account, the third-party account corresponding to an entity that is different than the marketplace service provider system.

17. The non-transitory computer-readable medium of claim 15, wherein the encrypted identifier further protects the financial account by providing information of the user without providing an account number of the financial account to which the encrypted identifier corresponds, and wherein the chat session is established by an e-commerce service provider.

18. The non-transitory computer-readable medium of claim 15, the operations further comprising:
  receiving, from the user device, credential information corresponding to the financial account; and
  transmitting, to the payment service provider, the credential information.

19. The non-transitory computer-readable medium of claim 15, the operations further comprising:
  identifying a reputation score associated with a user associated with the user device; and
  providing the reputation score to the payment service provider.

20. The non-transitory computer-readable medium of claim 19, wherein the causing the payment to be made from the financial account of the user for the purchase of the item includes utilizing a credit provided by the payment service provider for the payment, wherein the credit is provided based on the reputation score provided by the marketplace service provider system.

* * * * *